US012504789B2

(12) United States Patent
Kim et al.

(10) Patent No.: US 12,504,789 B2
(45) Date of Patent: Dec. 23, 2025

(54) METHOD FOR DISPLAYING BACKGROUND IMAGE THROUGH FLEXIBLE DISPLAY, AND ELECTRONIC DEVICE THEREFOR

(71) Applicant: Samsung Electronics Co., Ltd., Suwon-si (KR)

(72) Inventors: Bosung Kim, Suwon-si (KR); Yilee Seo, Suwon-si (KR); Jaemin Joo, Suwon-si (KR); Sungoh Kim, Suwon-si (KR); Jiyoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 18/502,626

(22) Filed: Nov. 6, 2023

(65) Prior Publication Data

US 2024/0069601 A1 Feb. 29, 2024

Related U.S. Application Data

(63) Continuation of application No. PCT/KR2022/008159, filed on Jun. 9, 2022.

(30) Foreign Application Priority Data

Jun. 9, 2021 (KR) ........................ 10-2021-0074948

(51) Int. Cl.
*G06F 1/16* (2006.01)
*G06T 7/11* (2017.01)
(Continued)

(52) U.S. Cl.
CPC .......... *G06F 1/1652* (2013.01); *G06F 1/1677* (2013.01); *G06T 7/11* (2017.01);
(Continued)

(58) Field of Classification Search
CPC combination set(s) only.
See application file for complete search history.

(56) References Cited

U.S. PATENT DOCUMENTS 10,133,310 B2 * 11/2018 Kim ........................ G06F 3/147
10,459,625 B2    10/2019 Seo et al.
(Continued)

FOREIGN PATENT DOCUMENTS

JP      2007-256310 A    10/2007
JP      2012-120098 A    6/2012
(Continued)

OTHER PUBLICATIONS

Korean Office Action dated Dec. 4, 2024, issued in Korean Patent Application No. 10-2021-0074948.
(Continued)

*Primary Examiner* — Lisa Lea-Edmonds
(74) *Attorney, Agent, or Firm* — Jefferson IP Law, LLP

(57) ABSTRACT

An electronic device is provided. The electronic device includes a flexible display divided into a first face and a second face with respect to a folding axis, and at least one processor operatively coupled to the display. The at least one processor is configured to display main content through a first area of the display, detect folding of the display while the main content is displayed, display the main content through a second area smaller than the first area, based on a folding angle of the display and a positional relationship between the electronic device and a user, and display background content in a third area which is an area excluding the second area. The background content is an image for filling a margin produced by displaying the main content in the second area.

20 Claims, 11 Drawing Sheets

(610)

(620)

(630)

(51) Int. Cl.
*G06V 10/40* (2022.01)
*H04M 1/02* (2006.01)

(52) U.S. Cl.
CPC .......... *G06V 10/40* (2022.01); *H04M 1/0268* (2013.01); *G06T 2207/20132* (2013.01)

(56) References Cited

U.S. PATENT DOCUMENTS

| | | | |
|---|---|---|---|
| 10,613,585 B2* | 4/2020 | Park | G09G 3/003 |
| 11,079,806 B2* | 8/2021 | Takeuchi | G06F 1/1677 |
| 11,455,925 B2 | 9/2022 | Kim et al. | |
| 11,636,791 B2* | 4/2023 | Park | G06F 3/0481 |
| | | | 345/156 |
| 11,693,558 B2* | 7/2023 | Noh | G06F 1/1643 |
| | | | 715/788 |
| 11,907,607 B2* | 2/2024 | Heo | G06T 15/506 |
| 12,131,676 B2* | 10/2024 | Park | G06F 3/04845 |
| 12,284,301 B2* | 4/2025 | Koh | G06F 3/04883 |
| 12,392,586 B2* | 8/2025 | Hong | F41J 3/0014 |
| 2007/0216950 A1 | 9/2007 | Yamakado et al. | |
| 2012/0060089 A1* | 3/2012 | Heo | G06F 3/04883 |
| | | | 715/702 |
| 2014/0055429 A1 | 2/2014 | Kwon et al. | |
| 2014/0306908 A1 | 10/2014 | Nagaraju | |
| 2015/0221065 A1 | 8/2015 | Kim et al. | |
| 2015/0278165 A1 | 10/2015 | Kim et al. | |
| 2015/0373480 A1* | 12/2015 | Park | H04W 4/70 |
| | | | 715/748 |
| 2016/0132074 A1* | 5/2016 | Kim | G06F 1/1652 |
| | | | 345/173 |
| 2016/0352887 A1 | 12/2016 | Na et al. | |
| 2017/0075640 A1 | 3/2017 | Chun et al. | |
| 2017/0205923 A1 | 7/2017 | Shim et al. | |
| 2018/0052579 A1* | 2/2018 | Rakshit | G09G 3/035 |
| 2018/0198987 A1* | 7/2018 | Park | H04N 23/63 |
| 2020/0210710 A1* | 7/2020 | Lee | G06V 20/41 |
| 2020/0333835 A1 | 10/2020 | Wi et al. | |
| 2021/0056878 A1 | 2/2021 | Lee et al. | |
| 2022/0050652 A1* | 2/2022 | Heo | G06F 1/1616 |
| 2022/0148475 A1* | 5/2022 | Park | G06F 1/1652 |
| 2022/0148476 A1* | 5/2022 | Min | G06F 1/1652 |
| 2022/0172326 A1 | 6/2022 | Jang et al. | |
| 2022/0377416 A1 | 11/2022 | Seo et al. | |
| 2023/0213978 A1* | 7/2023 | Kim | H04M 1/72448 |
| | | | 455/566 |
| 2023/0215312 A1* | 7/2023 | Park | G06F 3/04845 |
| | | | 345/156 |
| 2024/0069601 A1* | 2/2024 | Kim | G06F 1/1652 |
| 2024/0333831 A1* | 10/2024 | Pedan | G06F 3/0346 |
| 2024/0414254 A1* | 12/2024 | Kim | G06F 1/1677 |
| 2025/0118235 A1* | 4/2025 | Lee | H04M 1/72454 |

FOREIGN PATENT DOCUMENTS

| | | |
|---|---|---|
| JP | 2020-528164 A | 9/2020 |
| KR | 10-2012-0092036 A | 8/2012 |
| KR | 10-2014-0094958 A | 7/2014 |
| KR | 10-2015-0093090 A | 8/2015 |
| KR | 10-2015-0114184 A | 10/2015 |
| KR | 10-2016-0055646 A | 5/2016 |
| KR | 10-2016-0139132 A | 12/2016 |
| KR | 10-2017-0031525 A | 3/2017 |
| KR | 10-2017-0085344 A | 7/2017 |
| KR | 10-1785066 B1 | 10/2017 |
| KR | 10-2018-0057438 A | 5/2018 |
| KR | 10-1857062 B2 | 5/2018 |
| KR | 10-2019-0031033 A | 3/2019 |
| KR | 10-2019-0088406 A | 7/2019 |
| KR | 10-2004409 B1 | 7/2019 |
| KR | 10-2020-0045241 A | 5/2020 |
| KR | 10-2020-0122076 A | 10/2020 |
| KR | 10-2021-0021863 A | 3/2021 |
| KR | 10-2278816 B1 | 7/2021 |
| WO | 2014-175513 A1 | 10/2014 |

OTHER PUBLICATIONS

International Search Report dated Sep. 19, 2022, issued in International Patent Application No. PCT/KR2022/008159.
Korean Notice of Patent Grant dated Aug. 11, 2025, issued in Korean Patent Application No. 10-2021-0074948.

* cited by examiner

METHOD FOR DISPLAYING BACKGROUND IMAGE THROUGH FLEXIBLE DISPLAY, AND ELECTRONIC DEVICE THEREFOR

CROSS-REFERENCE TO RELATED APPLICATION(S)

This application is a continuation application, claiming priority under § 365(c), of an International application No. PCT/KR2022/008159, filed on Jun. 9, 2022, which is based on and claims the benefit of a Korean patent application number 10-2021-0074948, filed on Jun. 9, 2021, in the Korean Intellectual Property Office, the disclosure of which is incorporated by reference herein in its entirety.

BACKGROUND

1. Field

The disclosure relates to a method of displaying a main image and a background image through a flexible display, and an apparatus thereof.

2. Description of Related Art

A mobile terminal adopts a large screen to provide a lot of interactions and information through a display. In addition, in order to extend a display area, the mobile terminal adopts a foldable display or a rollable display, and provides a user interface suitable for this.

With the advent of the foldable or rollable terminal and technological advances, a function of the mobile terminal has been diversified. For example, the mobile terminal performs data and voice communication, photo and video recording through a camera, voice recording, an electronic game play function, and a multimedia player function. Due to the diversified function, the mobile terminal is implemented in the form of a multimedia device having complex functions such as capturing a photo or video, playing a music or video file, playing a game, receiving a broadcast, or the like.

The above information is presented as background information only to assist with an understanding of the disclosure. No determination has been made, and no assertion is made, as to whether any of the above might be applicable as prior art with regard to the disclosure.

SUMMARY

When a flexible electronic device is bent, an image displayed on a display is viewed as an image distorted in response to the bending from a user's point of view. Therefore, the electronic device displays the image such that the image displayed on the display is not distorted, which causes a margin portion in which the image is not displayed on the display.

Aspects of the disclosure are to address at least the above-mentioned problems and/or disadvantages and to provide at least the advantages described below. Accordingly, an aspect of the disclosure is to provide a method and electronic device for adjusting and displaying a main image such that the main image is not distorted by bending of a flexible display, and displaying a background image in a margin space in which the main image is not displayed.

Additional aspects will be set forth in part in the description which follows and, in part, will be apparent from the description, or may be learned by practice of the presented embodiments.

In accordance with an aspect of the disclosure, an electronic device is provided. The electronic device includes a flexible display divided into a first face and a second face with respect to a folding axis, and at least one processor operatively coupled to the display. The at least one processor may display main content through a first area of the display, detect folding of the display while the main content is displayed, display the main content through a second area smaller than the first area, based on a folding angle of the display and a positional relationship between the electronic device and a user, and display background content in a third area which is an area excluding the second area. The background content may be an image for filling a margin produced by displaying the main content in the second area.

In accordance with another aspect of the disclosure, a method of operating an electronic device is provided. The method includes displaying main content through a first area of a display, detecting folding of the display while the main content is displayed, displaying the main content through a second area smaller than the first area, based on a folding angle of the display and a positional relationship between the electronic device and a user, and displaying background content in a third area which is an area excluding the second area. The background content may be an image for filling a margin produced by displaying the main content in the second area.

According to various embodiments disclosed in the disclosure, a background image is displayed in a margin space of a screen, thereby increasing usability of a user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
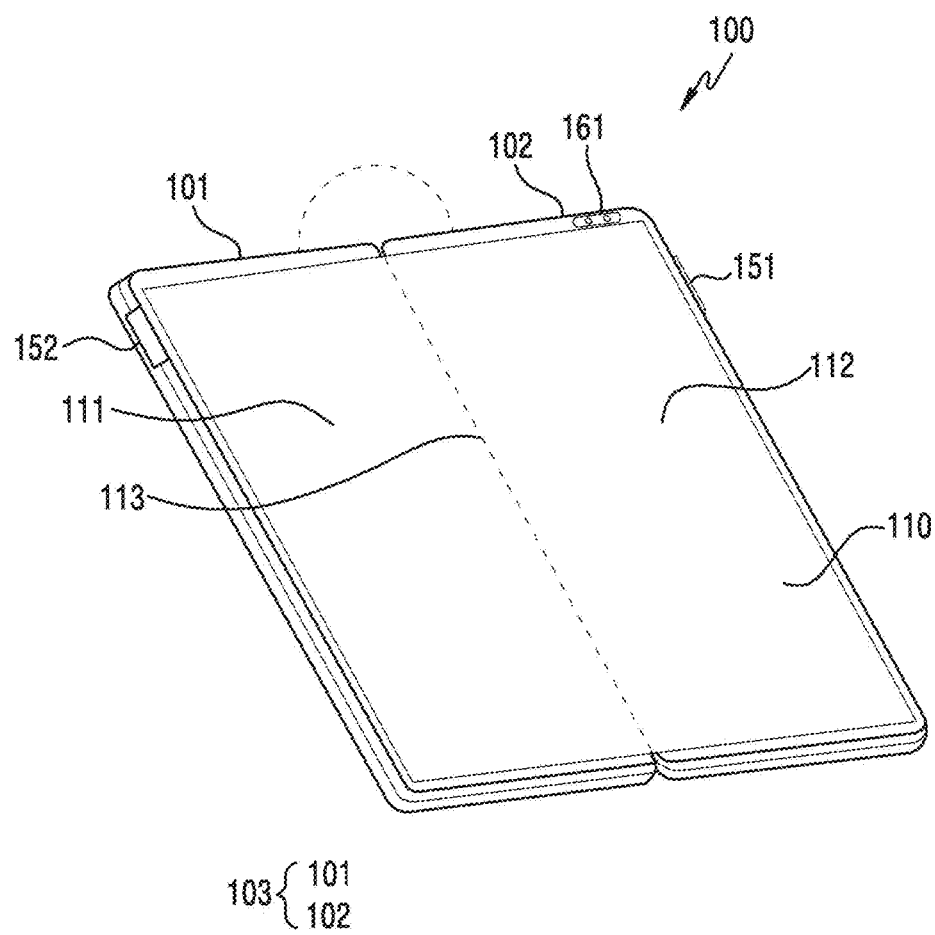
FIG. 1 illustrates an electronic device according to an embodiment of the disclosure.

FIG. 1 illustrates an electronic device according to an embodiment of the disclosure.

Referring to FIG. 1, an electronic device 100 (e.g., an electronic device 1101 of FIG. 11) may include a foldable housing (or a housing) 103 including a first housing 101 and a second housing 102, and a display 110 (e.g., a display module 1160 of FIG. 11) disposed to a face of the housing 103. The display 110 may include a first face 111 and a second face 112, divided about a folding axis 113. The first face 111 may be disposed to a face of the first housing 101, and the second face 112 may be disposed to a face of the second housing 102.

Referring to FIG. 1, the display 110 may be disposed to a front face of the electronic device 100 according to an embodiment. In an embodiment, the display 110 may occupy most of the front face of the electronic device 100. The display 110 and a bezel area surrounding at least one edge of the display 110 may be disposed to the front face of the electronic device 100. The display 110 may include a flat area and a curved area extending from the flat area towards a side face of the electronic device 100. The electronic device 100 of FIG. 1 is one example, and various embodiments are possible. For example, the display 110 of the electronic device 100 may include only the flat area without the curved area, or may have only the curved area at an edge of only one side, not both sides. In addition, in an embodiment, the curved area may extend to a rear face of the electronic device so that the electronic device 100 has an additional flat area.

In an embodiment, referring to FIG. 1, the electronic device 100 may be folded about the folding axis 113. For example, although FIG. 1 illustrates the electronic device 100 in a fully unfolded state, the electronic device 100 may be fully folded about the folding axis 113. Being fully folded may be understood as that the first face 111 and second face 112 of the display 110 are in contact. In the specification, the folding of the electronic device 100 may be referred to or understood as folding of the display 110.

In an embodiment, at least one physical key may be disposed to a side portion of the electronic device 100. For example, a first function key 151 for turning on/off the display 110 or turning on/off power of the electronic device 100 may be disposed to a right edge with respect to the front face of the electronic device 100. In an embodiment, a second function key 152 for controlling volume of the electronic device 100 or controlling screen brightness or the like may be disposed to a left edge with respect to the front face of the electronic device 100. In addition thereto, an additional button or key may also be disposed to the front face or rear face of the electronic device 100. For example, a physical button or touch button mapped to a specific function may be disposed to a lower area of a front bezel.

In an embodiment, the electronic device 100 may additionally include a speaker, receiver, proximity sensor, a home key, or the like. The electronic device 100 according to an embodiment may be provided by integrating a rear cover with a main body of the electronic device. In another embodiment, the rear cover may be detached from the main body of the electronic device 100 to have a shape capable of replacing a battery. The rear cover may be referred to as a battery cover or a rear cover.

In an embodiment, a front camera 161 (e.g., a camera module 1180 of FIG. 11) may be disposed to the front face of the electronic device 100. Although it is illustrated in the embodiment of FIG. 1 that the front camera 161 is exposed through a bezel, it may be exposed through an area of the display 110 in another embodiment. In an embodiment, the front camera 161 may be disposed to a lower portion of the display 110. For example, the front camera 161 may be disposed to the lower portion of the display 110 so as not to be exposed visually, and may be implemented as an Under Display Camera (UDC). In an embodiment, the electronic device 100 may include one or more front cameras 161. For example, the electronic device 100 may include two front cameras such as a first front camera and a second front camera. In an embodiment, the first front camera and the second front camera may be the same type cameras having the same specification (e.g., pixel), or the first front camera and the second camera may be implemented as cameras of different specifications. The electronic device 100 may support functions (e.g., 3D capturing, auto focus, etc.) related to a dual camera through the two front cameras. In an embodiment, a rear camera may be disposed to the rear face of the electronic device 100. Descriptions on the aforementioned front camera may be equally or similarly applied to the rear camera of the electronic device 100.

In an embodiment, the electronic device 100 may have various hardware components or sensors additionally disposed. For example, a distance sensor (e.g., a TOF sensor) may be further included to detect a distance between a subject and the electronic device 100. The distance sensor may be applied to both the front camera and/or the rear camera. The distance sensor may be separately disposed or included to be disposed to the front camera and/or the rear camera.

The electronic device 100 of FIG. 1 is only one example, and a shape of a device to which technical ideas disclosed in the disclosure are applied is not limited thereto. For example, the electronic device 100 may adopt a flexible display and a hinge structure so that folding is possible in a horizontal or vertical direction. For example, the technical ideas of the disclosure may be applied to a rollable electronic device. For example, the technical ideas of the disclosure may also be applied to a foldable tablet or a laptop computer. In addition, the technical ideas of the disclosure may also be applied to a case where a first camera and a second camera, facing the same direction, are disposed to face different directions by rotating, folding, or modifying the device.

Figure 2:
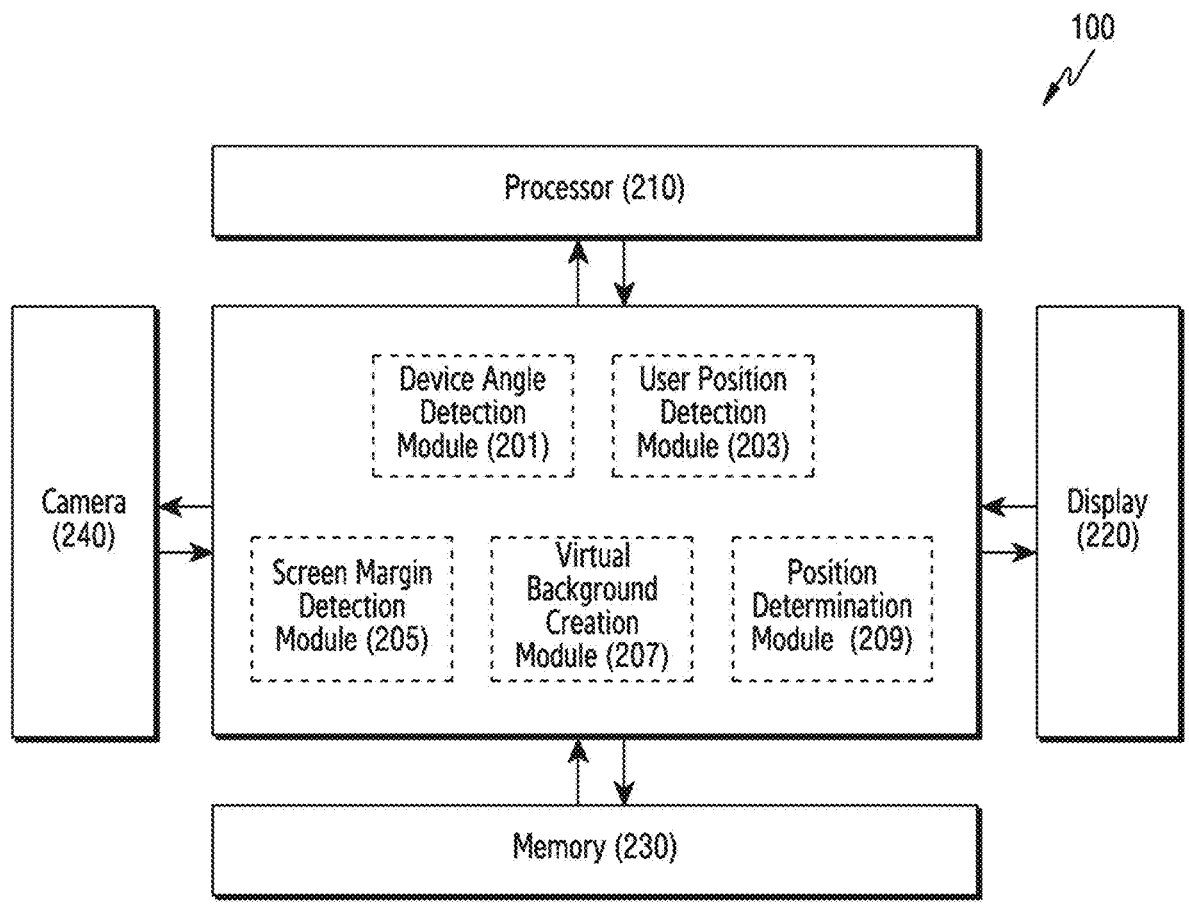
FIG. 2 illustrates concept of controlling a function for displaying main content and background content when an electronic device is folded according to an embodiment of the disclosure.

FIG. 2 illustrates concept of controlling a function for displaying main content and background content when an electronic device is folded according to an embodiment of the disclosure. In the description of FIG. 2, the structure and/or function of FIG. 1 may be described in brief or descriptions thereof may be omitted. The main content may be referred to or understood as a main image. The background content may be referred to or understood as a background image.

Referring to FIG. 2, the electronic device 100 may use a hardware and/or software module to support functions for displaying the main content and the background content in response to folding of the electronic device 100. For example, a processor 210 may execute instructions stored in a memory 230 to drive a device angle detection module 201, a user position detection module 203, a screen margin detection module 205, and a virtual background creation module 207. In other words, it may be understood that operations executed by the angle detection module 201, the user position detection module 203, the screen margin detection module 205, and the virtual background creation module 207 are executed by the processor 210. In various embodiments, a software module different from that of FIG. 2 may be implemented. For example, at least two modules may be integrated into one module, or one module may be divided into two or more modules. In addition, one function is shared by the hardware and software modules to improve work performance. For example, the electronic device 100 may include both a hardware encoder and a software module encoder, and some parts of data acquired through at least one camera module may be processed by the hardware encoder, and the remaining parts may be processed by the software encoder.

In an embodiment, the device angle detection module 201 may be a module for sensing a degree of folding the electronic device 100. The device angle detection module 201 may identify a positional relationship of the housings 101 and 102 through at least one motion sensor, and may determine a folding angle of the electronic device 100. The device angle detection module 201 may determine the folding angle of the electronic device 100 by using a torque detection sensor. The torque detection sensor may be a sensor for detecting a torque generated based on a motion of a hinge structure.

In an embodiment, the user position detection module 203 may determine a user's position by using at least one sensor. The user position detection module 203 may detect the user's position to create and/or dispose the background content with a specific sense of depth and perspective of the background content from the main content. The user position detection module 203 may detect position information such as a distance between the electronic device 100 and the user, and an angle or direction between the electronic device 100 and the user.

In an embodiment, the screen margin detection module 205 may identify a space for disposing the created background content. The screen margin detection module 205 may determine an area remaining after the main content is displayed as a margin space for disposing the background content.

In an embodiment, the virtual background creation module 207 may create the background content to be displayed in response to folding of the electronic device 100. The background content may be created based on an image stored in the electronic device 100, or may be created based on the main content. For example, the background content may be an image obtained by blurring the main content. The virtual background creation module 207 may create the background content, based on trained Artificial Intelligence (AI) (e.g., machine learning).

In an embodiment, a position determination module 209 may calculate a position for displaying the created background content and dispose the background content. In an embodiment, the position determination module 209 may calculate the position for disposing the background content (e.g., a distance or depth of the background content), based on at least one of a folding degree of the electronic device 100, a positional relationship between the user and the electronic device 100, a size of a screen margin, and/or a type of the main content. For example, the position determination module 209 may calculate the position for disposing the background content by assigning a weight to each of the above elements.

In an embodiment, the position determination module 209 may calculate a curvature of the display 220 according to the folding degree of the electronic device 100. The position determination module 209 may calculate the position for disposing the background content, based on the curvature. For example, the position determination module 209 may determine a weight, based on an average value for a depth of a curvature corresponding to the curvature of the display 220.

In an embodiment, the position determination module 209 may calculate the distance between the electronic device 100 and the user. The position determination module 209 may calculate the distance between the user and the electronic device 100 through a distance sensor. The position determination module 209 may determine a weight so as to increase a concentration of the main content and to feel a sense of perspective, based on the calculated distance.

In an embodiment, the position determination module 209 may calculation the position for disposing the background content, based on a size of a screen margin. The position determination module 209 may determine the weight, based on the size of the screen margin.

In an embodiment, the position determination module 209 may calculate the position for disposing the background content, based on a type of the main content. The position determination module 209 may calculate the position for disposing the background content, based on importance of the main content. For example, the position determination module 209 may dispose the background content such that a sense of distance between the main content and the background content is far, when there is a need to concentrate on the main content (e.g., watching a video). For example, the position determination module 209 may dispose the background content such that the sense of distance between the main content and the background content is close, when the main content is related to playing music.

In the embodiment of FIG. 2, it may be understood that the functions performed by the device angle detection module 201, the user position detection module 203, the screen margin detection module 205, and the virtual background creation module 207 are performed when the processor 210 executes instructions stored in the memory 230. In addition, in various embodiments, the electronic device 100 may use one or more hardware processing circuits to perform various functions and operations disclosed in the disclosure. For example, an Application Processor (AP) included in a mobile device, an Image Signaling Processor (ISP) mounted in a camera module, a DDIC, a touch IC, a Communication Processor (CP), a hardware encoder, or the like may be used to implement various embodiments disclosed in the disclosure. In addition, the connection relationship between hardware/software illustrated in FIG. 2 is for convenience of explanation, and does not restrict a flow/direction of data or commands. Components included in the electronic device 100 may have various electrical/operational connection relationships.

In an embodiment, the display 220 may display on the display 220 an execution screen of an application executed by the processor 210 or content such as an image and/or video stored in the memory 230. In addition, the processor 210 may display an image frame obtained through a camera 240 on a real-time basis in at least one area of the display 220 as a preview image.

In an embodiment, the memory 230 may store instructions executable by the processor 210. The memory 230 may be understood as concept including a component for temporarily storing data, such as a Random Access Memory (RAM), and/or a component for permanently storing data, such as a Solid State Drive (SSD). For example, the processor 210 may call instructions stored in the SSD to implement a software module in a RAM space. In various embodiments, the memory 230 may include various types, and a proper type may be selected according to a purpose of a device. A plurality of pieces of application information may be stored in the memory 230. An image for configuring the background content may be stored in the memory 230.

Components of FIG. 2 are for various purposes, and the electronic device 100 may further include additional components. For example, the electronic device 100 may further include at least one microphone for recording audio data. In addition, for example, the electronic device 100 may include at least one sensor for determining a direction in which a front face or rear face of the electronic device 100 faces and/or posture information of the electronic device 100. In an embodiment, the at least one sensor may include an acceleration sensor, a gyro sensor, or the like.

Figure 3:
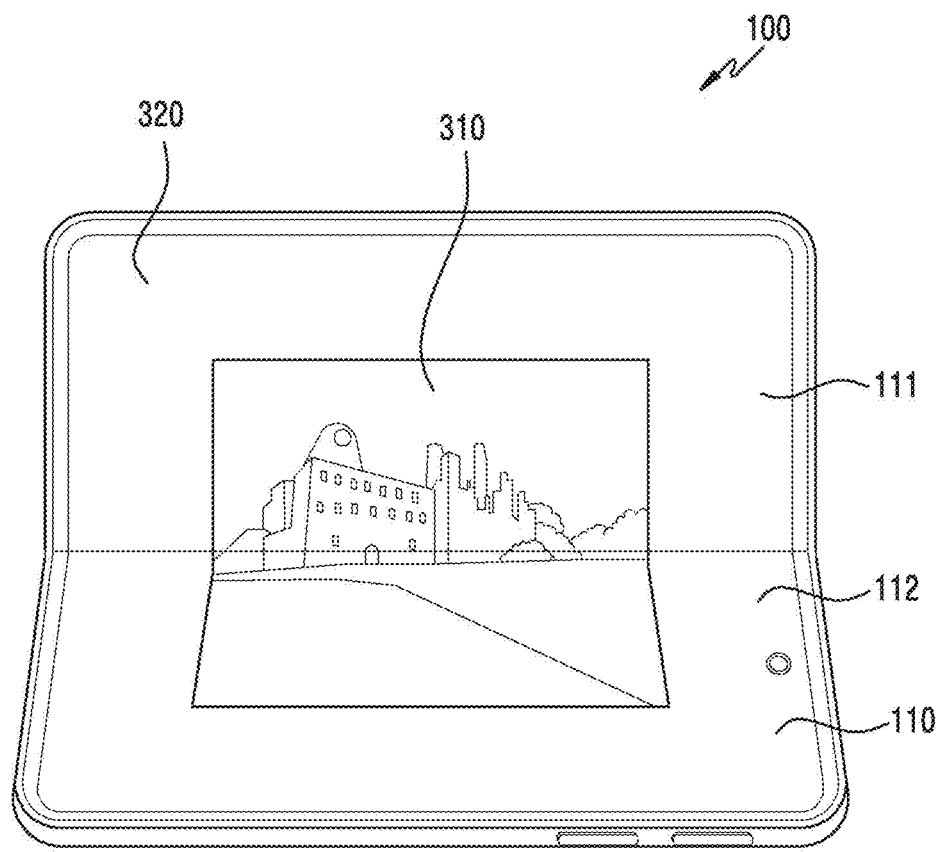
FIG. 3 illustrates that main content is displayed in a state where an electronic device is folded according to an embodiment of the disclosure.

FIG. 3 illustrates that main content is displayed in a state where an electronic device is folded according to an embodiment of the disclosure.

Referring to FIG. 3, the processor 210 may display main content 310 in response to folding of the electronic device 100. When the main content 310 is displayed, the processor 210 may display the main content 310 such that the main content 310 is viewed to a user in a distorted manner. The main content 310 may be disposed through at least one of the first face 111 and the second face 112. For example, the processor 210 may display one part of the main content 310 through the entirety of the first face 111, and may display the remaining parts of the main content 310 so as to be viewed in an extended manner on the second face 112. For example, the processor 210 may display one part of the main content 310 through the entirety of the second face 112, and may display the remaining parts of the main content 310 so as to be viewed in an extended manner on the first face 111. For example, the processor 210 may display one part of the main content 310 through one part of the first face 111, and may display the remaining parts of the main content 310 through one part of the second face 112.

In an embodiment, a size of the main content 310 may vary depending on a type of the main content or a degree of folding the electronic device 100. For example, the size of the main content may be decreased in proportion to the degree of folding the electronic device 100.

Referring to FIG. 3, a background area (or a margin space) 320 may be produced in an area remaining in the display 110 after the main content 310 is displayed. In other words, background content may be displayed in an area remaining after the main content 310 is displayed. The processor 210 may identify an outermost line of the main content 310, and may determine the background area 320 with respect to the outermost line. The processor 210 may separate and display the main content 310 and the background content with respect to the outermost line.

In an embodiment, the processor 210 may create the background content by imitating specific color in the main content 310. For example, the processor 210 may create the background content with color of an area (e.g., sky) representing transparent color in the main content 310.

Figure 4:
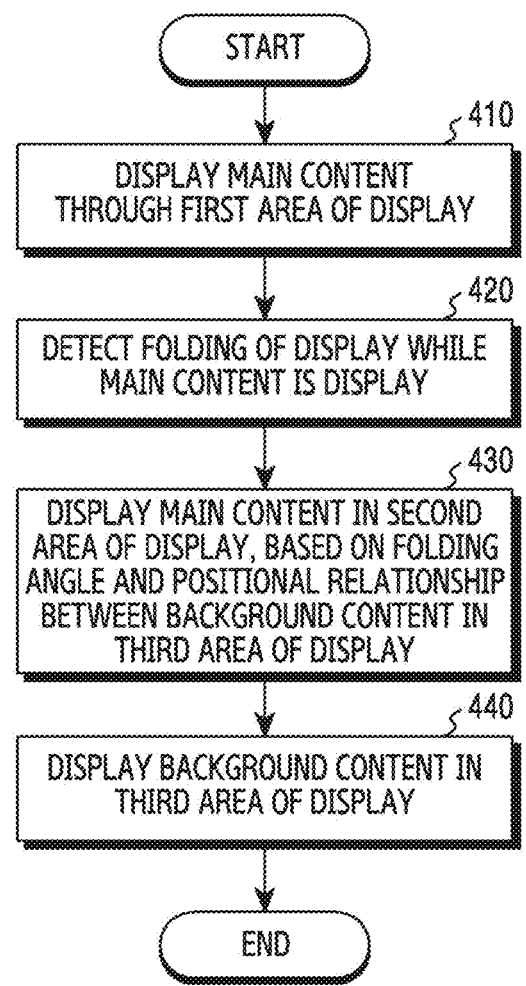
FIG. 4 is a flowchart illustrating a process of displaying background content in a margin space of a screen created in response to folding of an electronic device according to an embodiment of the disclosure

FIG. 4 is a flowchart illustrating a process of displaying background content in a margin space of a screen created in response to folding of an electronic device according to an embodiment of the disclosure. In the following embodiments, respective operations may be performed sequentially, but are not necessarily performed sequentially. For example, orders of the respective operations may be changed, and at least two operations may be performed in parallel.

In operation 410 according to an embodiment, the processor 210 may display main content through a first area of the display 110. The processor 210 may display the main content being executed through the first area of the display 110 in a state before the display 110 is folded. The first area may occupy most of the display 110.

In operation 420 according to an embodiment, the processor 210 may detect the folding of the display 110 while the main content is displayed. The processor 210 may detect the folding of the display 110 while the main content is displayed through the first area before the display 110 is folded. The folding may be caused by an external force, a button (e.g., a first function key) input, a display touch input, and a voice input.

In operation 430 according to an embodiment, the processor 210 may display the main content in the second area of the display 110, based on a folding or bending degree of the display 110 and a positional relationship between the electronic device 100 and a user. For example, the processor 210 may display the main content displayed through an area (e.g., the first area) occupying most of the display 110 through a narrower area (e.g., the second area). The processor 210 may adjust a display area of the main content such that the main content is viewed to the user in an original form, in order to prevent the main content from being displayed in a distorted manner in response to the bending of the display 110.

In operation 440 according to an embodiment, the processor 210 may display the background content in a third area of the display 110. The processor 210 may display the main content in the second area and display the background content in the third area. The third area may be referred to or understood as a background area. The third area may be a margin area excluding the second area in the display 110.

Figure 5:
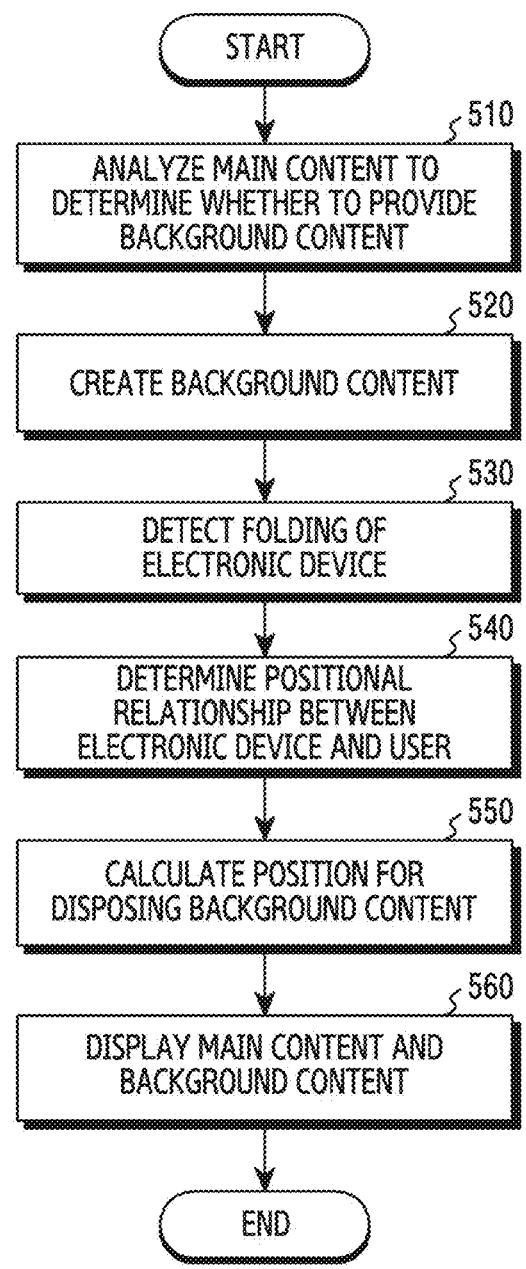
FIG. 5 is a flowchart illustrating a process of determining whether to provide background content and displaying the background content in a margin space of a screen, in an electronic device according to an embodiment of the disclosure.

FIG. 5 is a flowchart illustrating a process of determining whether to provide background content and displaying the background content in a margin space of a screen, in an electronic device according to an embodiment of the disclosure. In the following embodiments, respective operations may be performed sequentially, but are not necessarily performed sequentially. For example, orders of the respective operations may be changed, and at least two operations may be performed in parallel. For example, operations 510 and 520 may be performed later than operation 540. For example, operations 530 and 540 may be performed in parallel.

In operation 510 according to an embodiment, the processor 210 may analyze the main content to determine whether to provide the background content. According to an embodiment, the processor 210 may analyze the main content and provide the background content upon determining that it is necessary to provide the background content.

In an embodiment, the processor 210 may determine whether to provide the background content in consideration of a type of an application being executed. For example, when an application such as a video application or a game application is being executed, the processor 210 may determine that it is necessary to provide the background content in response to the folding of the electronic device 100. For example, when an album application is being executed, the processor 210 may determine that it is not necessary to provide the background content even if the electronic device 100 is folded. In an embodiment, the processor 210 may determine whether to provide the background content in consideration of content of the application being executed.

According to an embodiment, the processor 210 may not provide the background content even if it is determined that it is necessary to provide the background content as a result of analyzing the main content. For example, the background content may not be provided when a preview image obtained by a camera (e.g., the camera 240 of FIG. 2) is provided as the background content, when illumination is less than or equal to a threshold, or when it is determined that it is difficult to provide the preview image due to a temperature change. For example, the processor 210 may change a background area to a shape of a letter box (e.g., a black letter box). However, the disclosure is not limited thereto, and the letter box may be provided in various colors.

In operation 520 according to an embodiment, the processor 210 may create the background content. The processor 210 may create the background content to be displayed in a margin space produced in response to bending of the display 110.

In operation 530 according to an embodiment, the processor 210 may detect folding of the electronic device 100. The processor 210 may detect the folding of the electronic device 100 or the display 110 through at least one sensor. The processor 210 may detect an angle of the folding. For example, the processor 210 may detect the folding or the angle of the folding by using a motion sensor or a torque detection sensor.

In operation 540 according to an embodiment, the processor 210 may determine a positional relationship between the electronic device 100 and the user. The processor 210 may obtain position information between the electronic device 100 and the user. The processor 210 may measure a distance from the electronic device 100 to the user by using at least one sensor. The processor 210 may measure an angle and direction from the electronic device 100 to the user by using the camera 240 (e.g., the front camera 161 of FIG. 1).

In operation 550 according to an embodiment, the processor 210 may calculate a position for disposing the background content. The processor 210 may calculate the position for disposing the background content, based on at least one of a folding degree of the electronic device 100, the positional relationship between the user and the electronic device 100, a size of a screen margin space, and/or a type of the main content.

In operation 560 according to an embodiment, the processor 210 may display the main content and the background content. The operation 560 may correspond to the operation 450 of FIG. 4.

In an embodiment, when the electronic device 100 or the display 110 transitions from a folding state to a default state (e.g., a state of not being bent), the processor 210 may not display the background content but display only the main content.

Figure 6:
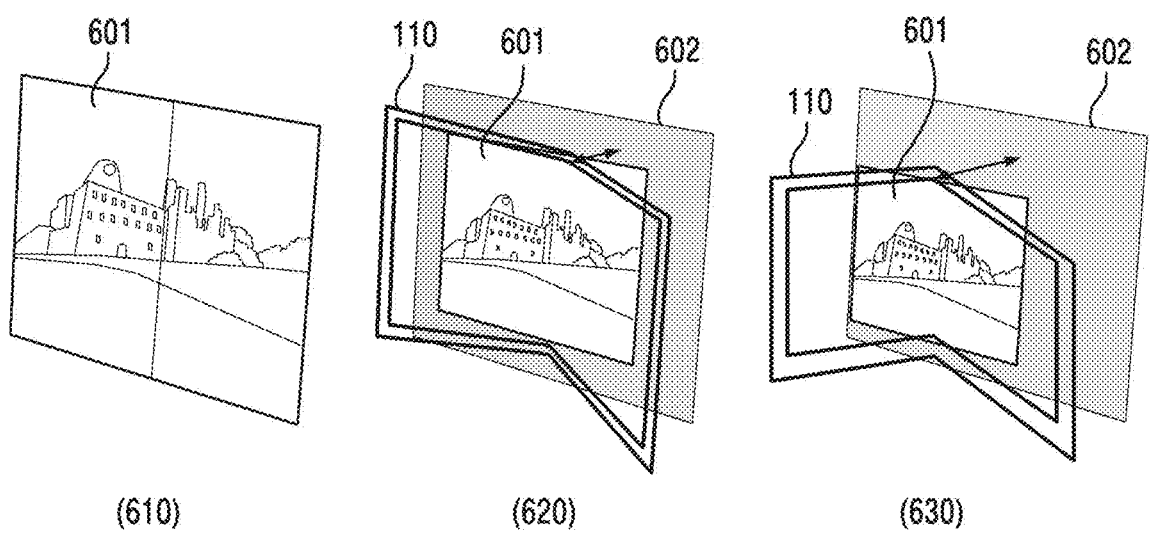
FIG. 6 illustrates main content and background content which vary depending on a folding angle of an electronic device according to an embodiment of the disclosure.

FIG. 6 illustrates main content and background content which vary depending on a folding angle of an electronic device according to an embodiment of the disclosure.

Referring to FIG. 6, a reference numeral 610 indicates a state where the display 110 is unfolded, a reference numeral 620 indicates a state where the display 110 is folded by a first angle, and a reference numeral 630 indicates a state where the display 110 is folded by a second angle. It shows that the display 110 is more folded when the reference numeral increases from the reference numeral 610 to the reference numeral 630.

In an embodiment, a size of main content 601 may vary depending on a folding degree of the electronic device 100. In an embodiment, a sense of distance (or depth) of background content 602 may vary depending on the folding degree of the electronic device 100. In an embodiment, clarity of the background content 602 may vary depending on the folding degree of the electronic device 100. For example, the more the electronic device 100 is folded, the smaller the size of the main content 601, the farther the sense of distance of the background content, and the lower the clarity of the background content 602.

Referring to the reference numeral 610, the processor 210 may display the main content 601 through the display 110 in a state where the electronic device 100 is unfolded. The processor 210 may display the main content 601, without the background content, through the display 110.

Referring to the reference numeral 620, when the electronic device 100 is folded by the first angle, the main content may be displayed with a first size. When the electronic device is folded by the first angle, the background content 602 may be disposed with a sense of distance (or depth) which is far by a first distance from the main content 601.

Referring to the reference numeral 630, when the electronic device 100 is folded by the second angle, the main content may be displayed with a second size. When the electronic device 100 is folded by the second angle, the background content 602 may be disposed with a sense of distance (or depth) which is far by a second distance from the main content 601. The second distance may be greater than the first distance.

Figure 7:
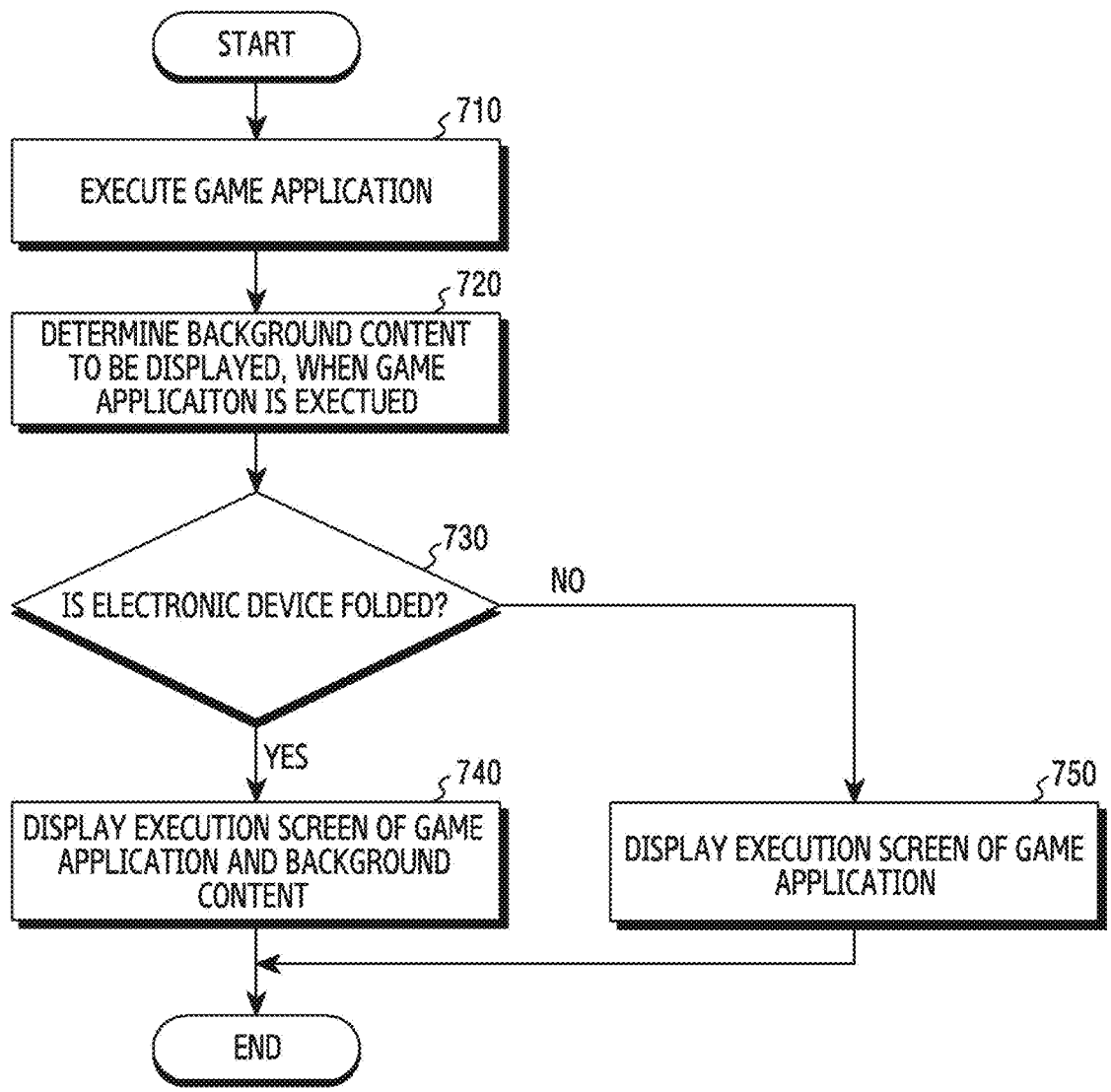
FIG. 7 is a flowchart illustrating a process of displaying background content, when a game application is executed in an electronic device according to an embodiment of the disclosure.

FIG. 7 is a flowchart illustrating a process of displaying background content, when a game application is executed in an electronic device according to an embodiment of the disclosure. The game application is only one example, and is also applicable to another application, which is apparent to those ordinarily skilled in the art.

Referring to FIG. 7, in operation 710 according to an embodiment, the processor 210 may execute the game application. The processor 210 may execute the game application in response to a user's input for executing the game application. The processor 210 may execute the game application by executing an instruction stored in a memory.

In operation 720 according to an embodiment, the processor 210 may determine background content to be displayed in the display 110, when the game application is executed. The background content may be displayed in a background area excluding an area of the display 110, occupied by a screen of the game application.

In an embodiment, the processor 210 may determine the background content, based on a type of the game application to be executed. For example, when the game application is a multi-player game played by two or more people, the processor 210 may determine at least one of a game screen of a game opponent, an appearance of the game opponent, and an avatar corresponding to the game opponent as the background content. For example, when the game application is a one-player game, the processor 210 may determine at least one of an appearance of a user of the electronic device 100 and a predetermined image as the background content.

In operation 730 according to an embodiment, the processor 210 may determine whether the electronic device 100 is folded. The processor 210 may perform operation 740 when the electronic device 100 is folded, and may perform operation 750 when the electronic device 100 is unfolded.

In operation 740 according to an embodiment, when the electronic device 100 is unfolded, the processor 210 may display an execution screen of the game application and the background content. In operation 750 according to an embodiment, when the electronic device 100 is folded, the processor 210 may not display the background display but display the execution screen of the game application.

Figure 8:
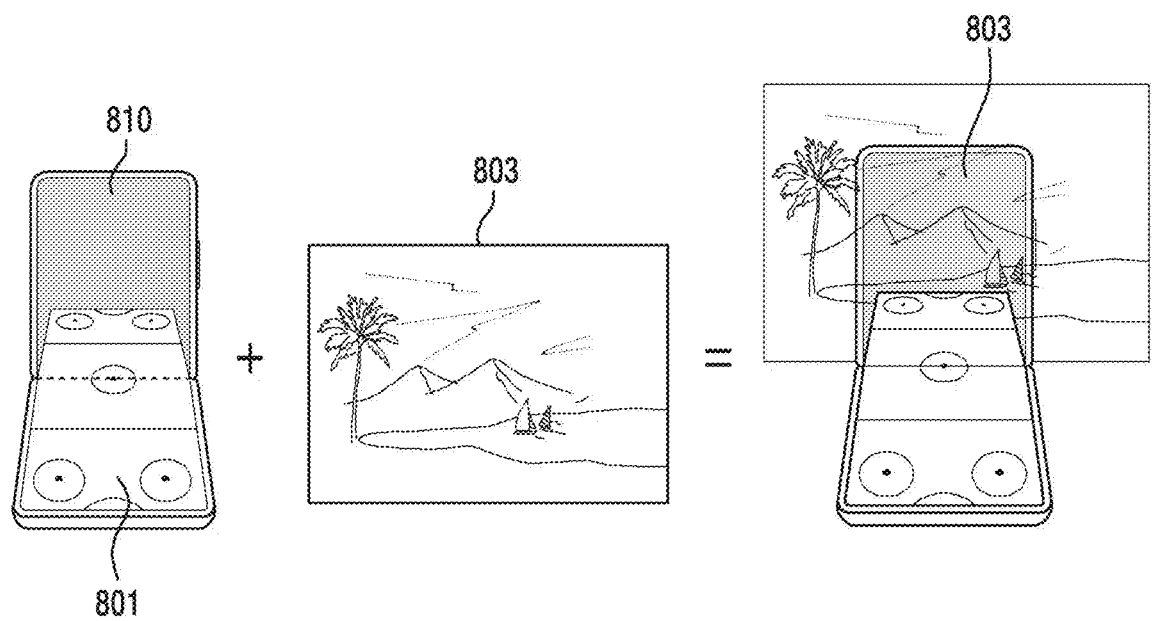
FIG. 8 illustrates that an application execution screen and background content are displayed when a game application is executed in an electronic device according to an embodiment of the disclosure.

FIG. 8 illustrates that an application execution screen and background content are displayed when a game application is executed in an electronic device according to an embodiment of the disclosure.

Referring to FIG. 8, when the processor 210 executes the game application, the processor 210 may display a game application execution screen 801 in at least one portion of the display 110. When the electronic device 100 is folded, the processor 210 may display the game application execution screen 801 by using the first face 111 and/or second face 112 of the display 110. The processor 210 may calculate a background area 810 excluding the game application execution screen 801. The processor 210 may display designated background content 803 in the background area 810.

In an embodiment, the processor 210 may select at least one of the plurality of pieces of background content 803. For example, the processor 210 executes the game application, and may determine one of images stored in the electronic device 100 to display it in the background area 810. The processor 210 may crop the determined image and display a cropped portion in the background area 810.

In an embodiment, the processor 210 may execute the game application and display a game opponent in the background area 810. For example, the processor 210 may receive an image of capturing an opponent appearance by using the same function as video telephony and display the image in the background area 810.

In an embodiment, when the game application is executed, the processor 210 may display a game avatar in the background area 810. The avatar may be an avatar corresponding to the game opponent. The avatar may be an avatar randomly selected by a user of the electronic device 100.

Figure 9:
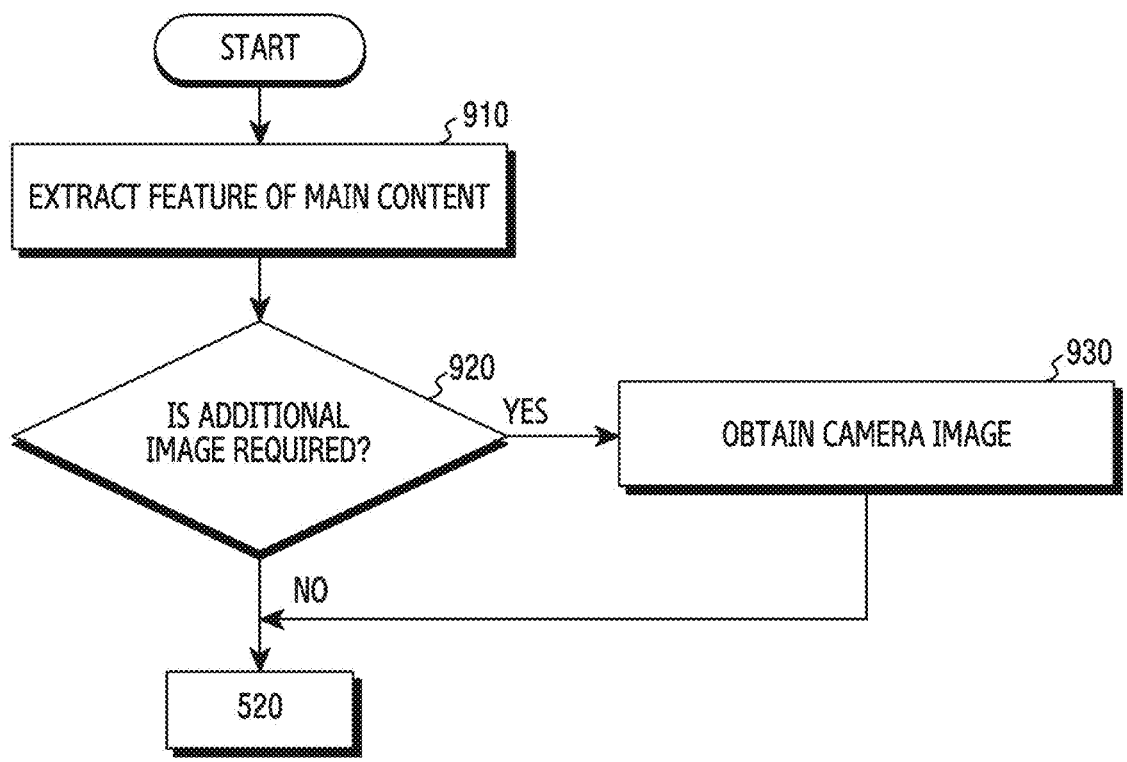
FIG. 9 is a flowchart illustrating a process of generating background content by extracting a feature of main content in an electronic device according to an embodiment of the disclosure.

FIG. 9 is a flowchart illustrating a process of generating background content by extracting a feature of main content in an electronic device according to an embodiment of the disclosure. Respective operations in the following embodiment may be performed sequentially, but are not necessarily performed sequentially. Orders of the respective operations may be changed, and at least two operations may be performed in parallel.

Referring to FIG. 9, in operation 910 according to an embodiment, the processor 210 may extract a feature of the main content. The processor 210 may extract the feature of the main content to create the background content. The processor 210 may extract a type, detail, and representative color of the main content to create the background content.

In operation 920 according to an embodiment, the processor 210 may determine whether an additional image to be displayed as the background content is required. When there is little or no feature of the main content, the processor 210 may determine that the additional image to be displayed as the background content is required. When it is unable to detect the representative color of the main content, the processor 210 may determine that the additional image is required. The processor 210 may perform operation 930 upon determining that the additional image is required, and may not perform operation 520 upon determining that the additional image is not required.

In operation 930 according to an embodiment, the processor 210 may obtain a camera image. The processor 210 may store an image frame obtained through the camera 240 in the memory 230 or in a buffer to utilize it as the background content.

Figure 10:
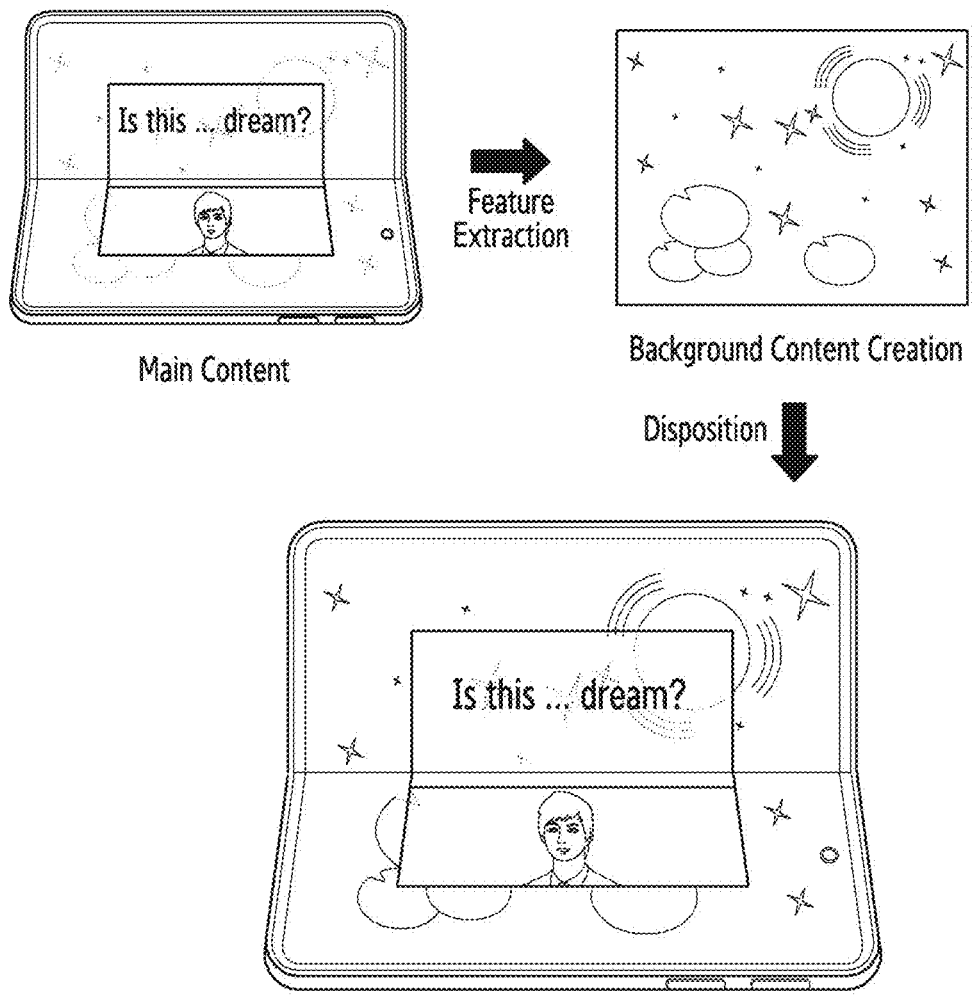
FIG. 10 illustrates that background content is created and displayed based on main content in an electronic device according to an embodiment of the disclosure.

FIG. 10 illustrates that background content is created and displayed based on main content in an electronic device according to an embodiment of the disclosure.

Referring to FIG. 10, the processor 210 may create the background content (or a virtual background), based on the main content. The processor 210 may extract a feature of the main content to create the background content. The processor 210 may extract the feature of the main content, based on trained machine learning. The processor 210 may create the background content related to the feature of the main content. For example, referring to FIG. 10, the processor 210 may create the background content, based on a subtitle displayed in the main content. In other words, when a subtitle such as 'Is this . . . a dream?' is displayed as the subtitle displayed on the main content, the processor 210 may create an image related to the dream as the background content. The processor 210 may display the create background content in a margin space of the display 110.

Figure 11:
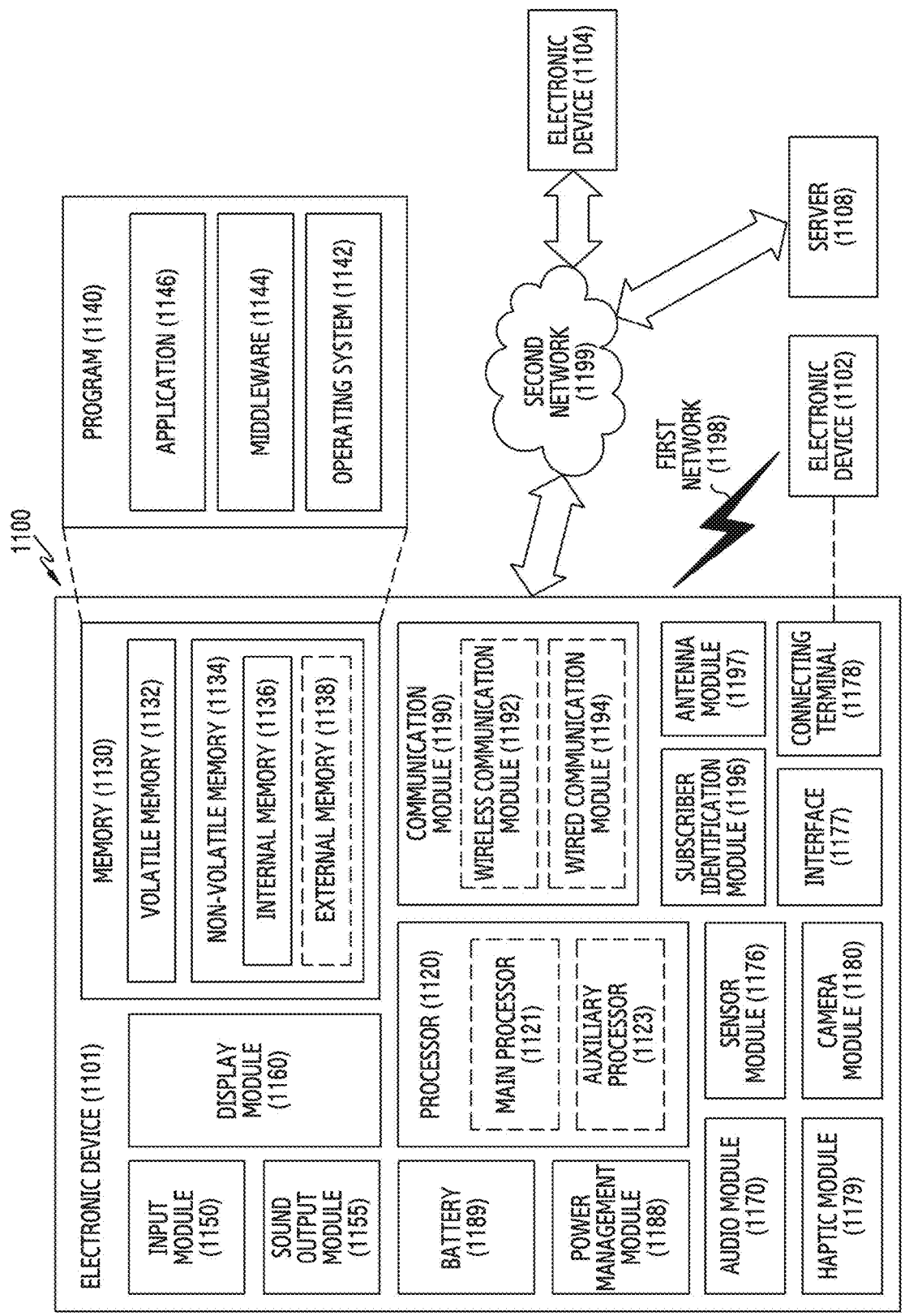
FIG. 11 is a block diagram of an electronic device in a network environment according to an embodiment of the disclosure.

FIG. 11 is a block diagram illustrating an electronic device in a network environment according to various embodiments.

Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102 or 1104, or server 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

As described above, an electronic device (e.g., the electronic device 100 of FIG. 1) according to an embodiment may include a flexible display (e.g., the display 110 of FIG. 1) divided into a first face (e.g., the first face 111 of FIG. 1) and a second face (e.g., the second face 112 of FIG. 1) with respect to a folding axis, and at least one processor (e.g., the processor 210 of FIG. 2) operatively coupled to the display. The at least one processor may display main content through a first area of the display, detect folding of the display while the main content is displayed, display the main content through a second area smaller than the first area, based on a folding angle of the display and a positional relationship between the electronic device and a user, and display background content in a third area which is an area excluding the second area. The background content may be an image for filling a margin produced by displaying the main content in the second area.

According to an embodiment, the at least one processor may determine a fourth area for displaying at least one part of the main content on the first face and a fifth area for display the remaining parts of the main content on the second face, based on a degree of the folding and the positional relationship between the electronic device and the user, and display the main content in the fourth area and the fifth area. The second area may include the fourth area and the fifth area.

According to an embodiment, the at least one processor may detect a feature point of the main content and create the background content, based on the detected feature point.

According to an embodiment, the at least one processor may create the background content, based on at least one of a type of an application executed as the main content, color included in the main content, and a message included in the main content.

According to an embodiment, the at least one processor may change a size or position of displaying the main content and the background content, based on the folding angle.

According to an embodiment, the at least one processor may display the main content with a first size when the display is folded by a first angle, and display the main content with a second size when the display is folded by a second angle.

According to an embodiment, the at least one processor may display the background content by cropping it with a third size when the display is folded by a first angle, and display the background content by cropping it with a fourth size when the display is folded by a second angle.

According to an embodiment, the electronic device may further include a camera. The at least one processor may display a preview image obtained through the camera in the third area as the background content.

According to an embodiment, when the main content is an execution screen of a game application, the background content may be a screen including an avatar, or an image in which a game opponent appears.

According to an embodiment, when the game application is executed by at least two people, the at least one processor may display the screen including the avatar, or the image in which the game opponent appears, as the background content.

As described above, a method of operating an electronic device (e.g., the electronic device 100 of FIG. 1) according to an embodiment may include displaying main content through a first area of a display (e.g., the display 110 of FIG. 1), detecting folding of the display while the main content is displayed, displaying the main content through a second area smaller than the first area, based on a folding angle of the display and a positional relationship between the electronic device and a user, and displaying background content in a third area which is an area excluding the second area, wherein the background content is an image for filling a margin produced by displaying the main content in the second area.

The method of operating the electronic device according to an embodiment may include determining a fourth area for displaying at least one part of the main content on the first face and a fifth area for display the remaining parts of the main content on the second face, based on a degree of the folding and the positional relationship between the electronic device and the user, and displaying the main content in the fourth area and the fifth area, wherein the second area includes the fourth area and the fifth area.

The method of operating the electronic device according to an embodiment may include detecting a feature point of the main content, and creating the background content, based on the detected feature point.

The method of operating the electronic device according to an embodiment may include creating the background content, based on at least one of a type of an application being executed as the main content, color representing the main content, and a message included in the main content.

The method of operating the electronic device according to an embodiment may include determining whether it is able to provide the background content, based on at least one of temperature and illumination outside of the electronic device, and changing the background content into a letter box upon determining that it is unable to provide the background content.

The method of operating the electronic device according to an embodiment may include changing a size or position of displaying the main content and the background content, based on the folding angle.

The method of operating the electronic device according to an embodiment may include displaying the main content with a first size when the display is folded by a first angle, and displaying the main content with a second size when the display is folded by a second angle.

The method of operating the electronic device according to an embodiment may include displaying the background content by cropping it with a third size when the display is folded by a first angle, and displaying the background content by cropping it with a fourth size when the display is folded by a second angle.

The method of operating the electronic device according to an embodiment may include displaying a preview image obtained through the camera in the third area as the background content.

In the method of operating the electronic device according to an embodiment, when the main content is an execution screen of a game application, the background content may be a screen including an avatar, or an image in which a game opponent appears.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a flexible display divided into a first face and a second face with respect to a folding axis; and
at least one processor operatively coupled to the flexible display,
wherein the at least one processor is configured to:
display main content through a first area of the flexible display,
detect folding of the flexible display while the main content is displayed, display the main content through a second area smaller than the first area, based on a folding angle of the flexible display and a positional relationship between the electronic device and a user, and display background content in a third area which is an area excluding the second area, wherein the background content is an image for filling a margin produced by displaying the main content in the second area.

2. The electronic device of claim 1, wherein the at least one processor is further configured to:
determine a fourth area for displaying at least one part of the main content on the first face and a fifth area for flexible display the remaining parts of the main content on the second face, based on a degree of the folding and the positional relationship between the electronic device and the user, and
display the main content in the fourth area and the fifth area, wherein the second area includes the fourth area and the fifth area.

3. The electronic device of claim 1, wherein the at least one processor is further configured to detect a feature point of the main content and creates the background content, based on the detected feature point.

4. The electronic device of claim 3, wherein the at least one processor is further configured to create the background content, based on at least one of a type of an application executed as the main content, color included in the main content, and a message included in the main content.

5. The electronic device of claim 1, wherein the at least one processor is further configured to change a size or position of the displaying of the main content and the background content, based on the folding angle.

6. The electronic device of claim 1, wherein the at least one processor is further configured to display the main content with a first size when the flexible display is folded by a first angle, and display the main content with a second size when the flexible display is folded by a second angle.

7. The electronic device of claim 1, wherein the at least one processor is further configured to display the background content by cropping it with a third size when the display is folded by a first angle, and display the background content by cropping it with a fourth size when the flexible display is folded by a second angle.

8. The electronic device of claim 1, further comprising a camera, wherein the at least one processor is further configured to display a preview image obtained through the camera in the third area as the background content.

9. The electronic device of claim 1, wherein, when the main content is an execution screen of a game application, the background content is a screen including an avatar, or an image in which a game opponent appears.

10. The electronic device of claim 9, wherein, when the game application is executed by at least two people, the at least one processor is further configured to display the screen including the avatar, or the image in which the game opponent appears, as the background content.

11. A method of operating an electronic device, the method comprising:
displaying main content through a first area of a flexible display;
detecting folding of the display while the main content is displayed;
displaying the main content through a second area smaller than the first area, based on a folding angle of the display and a positional relationship between the electronic device and a user; and
displaying background content in a third area which is an area excluding the second area, wherein the background content is an image for filling a margin produced by displaying the main content in the second area.

12. The method of claim 11,
wherein the flexible display is divided into a first face and a second face with respect to a folding axis, and
wherein the method further comprises:
determining a fourth area for displaying at least one part of the main content on the first face and a fifth area for flexible display the remaining parts of the main content on the second face, based on a degree of the folding and the positional relationship between the electronic device and the user; and
displaying the main content in the fourth area and the fifth area, wherein the second area includes the fourth area and the fifth area.

13. The method of claim 11, further comprising:
detecting a feature point of the main content; and
creating the background content, based on the detected feature point.

14. The method of claim 11, further comprising creating the background content, based on at least one of a type of an application being executed as the main content, color representing the main content, and a message included in the main content.

15. The method of claim 11, further comprising:
determining whether it is able to provide the background content, based on at least one of temperature and illumination outside of the electronic device; and
changing the background content into a letter box upon determining that it is unable to provide the background content.

16. The method of claim 11, further comprising:
changing a size or position of displaying the main content and the background content, based on the folding angle.

17. The method of claim 11, further comprising:
displaying the main content with a first size when the display is folded by a first angle; and
displaying the main content with a second size when the display is folded by a second angle.

18. The method of claim 11, further comprising:
displaying the background content by cropping it with a third size when the display is folded by a first angle; and
displaying the background content by cropping it with a fourth size when the display is folded by a second angle.

19. The method of claim 11, further comprising:
displaying a preview image obtained through the camera in the third area as the background content.

20. The method of claim 11, further comprising:
when the main content is an execution screen of a game application, the background content may be a screen including an avatar, or an image in which a game opponent appears.

* * * * *